(12) United States Patent
Kim et al.

(10) Patent No.: US 8,970,107 B2
(45) Date of Patent: Mar. 3, 2015

(54) FLAT PANEL DISPLAY APPARATUS AND METHOD OF MANUFACTURING THE SAME

(75) Inventors: Hye-Sun Kim, Yongin (KR); Eun-Ah Kim, Yongin (KR); Min-Su La, Yongin (KR)

(73) Assignee: Samsung Display Co., Ltd. (KR)

( * ) Notice: Subject to any disclaimer, the term of this patent is extended or adjusted under 35 U.S.C. 154(b) by 330 days.

(21) Appl. No.: 13/351,474

(22) Filed: Jan. 17, 2012

(65) Prior Publication Data
US 2012/0235048 A1 Sep. 20, 2012

(30) Foreign Application Priority Data
Mar. 18, 2011 (KR) .................. 10-2011-0024340

(51) Int. Cl.
*G02F 1/1333* (2006.01)
*B32B 37/14* (2006.01)

(52) U.S. Cl.
CPC ............ *G02F 1/133308* (2013.01); *G02F 2001/133331* (2013.01); *G02F 2202/28* (2013.01)
USPC ............................ 313/512; 349/110; 445/25

(58) Field of Classification Search
CPC ............. G02F 1/133512; G02F 2001/133331; G02F 2202/28
USPC .............. 349/110; 313/512, 110, 112; 445/25
See application file for complete search history.

(56) References Cited

U.S. PATENT DOCUMENTS

| 2010/0103599 | A1 | 4/2010 | Kwak et al. | |
|---|---|---|---|---|
| 2011/0025942 | A1* | 2/2011 | Lee | 349/58 |
| 2011/0134378 | A1* | 6/2011 | Tsuboi et al. | 349/110 |
| 2011/0205472 | A1* | 8/2011 | Kobayashi et al. | 349/104 |

FOREIGN PATENT DOCUMENTS

| JP | 2005-099541 | 4/2005 |
|---|---|---|
| JP | 2007-103027 | 4/2007 |
| KR | 10 2007 0070706 | 7/2007 |
| KR | 10 2010 0046903 | 5/2010 |

* cited by examiner

*Primary Examiner* — Karabi Guharay
(74) *Attorney, Agent, or Firm* — Knobbe Martens Olson & Bear LLP

(57) ABSTRACT

A flat panel display apparatus includes a panel including an image region on which an image is realized, a window covering the panel, a black matrix formed in the window along a side edge of the image region, and a resin layer that is ultraviolet (UV) curable and that bonds the panel and the window. The black matrix includes a black ink part for blocking UV rays, and a diffusion ink part for transmitting UV rays. In the flat panel display apparatus, the resin layer for window bonding is sufficiently cured in all regions, including a region thereof under the black matrix, so that a bonding defect in the window due to insufficient curing of the resin layer is significantly decreased.

16 Claims, 3 Drawing Sheets

FLAT PANEL DISPLAY APPARATUS AND METHOD OF MANUFACTURING THE SAME

CROSS-REFERENCE TO RELATED APPLICATIONS

This application claims the benefit of Korean Patent Application No. 10-2011-0024340, filed on Mar. 18, 2011, in the Korean Intellectual Property Office, the disclosure of which is incorporated herein in its entirety by reference.

BACKGROUND

1. Field

The present disclosure relates to a flat panel display apparatus and a method of manufacturing the same, and more particularly, to a flat panel display apparatus in which a window is smoothly bonded, and a method of manufacturing the flat panel display apparatus.

2. Description of the Related Technology

Recently, traditional display apparatuses have been replaced with thin flat panel display apparatuses including organic light-emitting display apparatuses, liquid crystal display (LCD) apparatuses, plasma displays, light-emitting diode displays, electroluminescent displays, surface-conduction electron-emitter displays, field emission displays (also called nano-emissive displays, and other volatile and static display technologies.

In general, a flat panel display apparatus has a structure in which a protective window is formed on a panel on which an image is realized. The panel and the window are bonded to each other by using a layer of resin, and then ultraviolet (UV) rays are irradiated from an external source above the window so as to cure the resin layer, so that the panel and the window are firmly combined.

A black matrix is formed in the window so as to cover an edge of an image region of the panel. However, since UV rays do not smoothly pass through the black matrix, a portion of the resin layer below the black matrix is not cured well, and thus a window bonding defect may be incurred.

In order to solve this problem, according to a recently presented method, UV rays are irradiated not only from above the window but also from sides of the window so as to eliminate a region in which UV rays are blocked by the black matrix.

However, in a region of the panel in which a flexible printed circuit board (FPCB) is mounted, even UV rays that are irradiated from the sides of the window are blocked by the FPCB. The FPCB electrically connects the panel and a controller, and is highly flexible, and thus when a portion of the FPCB is bent, sides of the resin layer may be blocked by the FPCB. Thus, if the resin layer is not fully cured, the window is not completely bonded to the panel, and thus a product defect may be incurred.

Thus, in consideration of the aforementioned problems, there is an increasing demand for a solution capable of effectively reducing a possibility of a bonding defect with respect to the window in a region corresponding to the black matrix.

SUMMARY OF CERTAIN INVENTIVE ASPECTS

Embodiments of the present invention provide a flat panel display apparatus improved to effectively prevent a bonding defect with respect to a window by allowing ultraviolet (UV) rays to be smoothly irradiated to an entire region of a resin layer so as to cure the resin layer.

According to one aspect, there is provided a flat panel display apparatus including a panel including an image region on which an image is realized; a window covering the panel; a black matrix formed in the window along a side edge of the image region; and a resin layer that is UV curable and is configured to bond the panel and the window, wherein the black matrix includes a black ink part for blocking UV rays, and a diffusion ink part for transmitting UV rays.

The black ink part may be formed of carbon black, and the diffusion ink part may be formed of a mixture of carbon black and a UV-transmitting material.

The UV-transmitting material may include at least one of acrylic resin, cyclohexanone, aromatic hydrocarbon solvent, and ethylene glycol monoethyl ether acetate.

The black ink part may be formed along the side edge of the image region, and the diffusion ink part may be formed at a position of the side edge of the image region corresponding to a region in which a flexible printed circuit board (FPCB) of the panel is formed.

The black ink part may be formed along the side edge of the image region, and the diffusion ink part may have a closed-loop shape formed along an inner side edge of the black ink part.

The black ink part may be formed along the side edge of the image region, and the diffusion ink part may be formed in the image region of the panel.

A polarizing film may be interposed between the panel and the resin layer.

According to another aspect, there is provided a method of manufacturing a flat panel display apparatus, the method including the operations of preparing a panel including an image region on which an image is realized, and a window covering the panel; forming a black matrix in the window along a side edge of the image region; forming a resin layer that is ultraviolet (UV) curable between the panel and the window; and curing the resin layer by irradiating UV rays to the UV curable resin layer, wherein the forming of the black matrix comprises forming a black ink part for blocking UV rays, and forming a diffusion ink part for transmitting UV rays.

The black ink part may be formed of carbon black, and the diffusion ink part may be formed of a mixture of carbon black and a UV-transmitting material.

The UV-transmitting material may include at least one of acrylic resin, cyclohexanone, aromatic hydrocarbon solvent, and ethylene glycol monoethyl ether acetate.

The black ink part may be formed along the side edge of the image region, and the diffusion ink part may be formed at a position of the side edge of the image region corresponding to a region in which a flexible printed circuit board (FPCB) of the panel is formed.

The black ink part may be formed along the side edge of the image region, and the diffusion ink part may have a closed-loop shape formed along an inner side edge of the black ink part.

The black ink part may be formed along the side edge of the image region, and the diffusion ink part may be formed in the image region of the panel.

The method may further include the operation of forming a polarizing film between the panel and the resin layer.

BRIEF DESCRIPTION OF THE DRAWINGS

The above and other features and advantages will become more apparent by describing in detail certain embodiments with reference to the attached drawings in which.

DETAILED DESCRIPTION OF CERTAIN INVENTIVE EMBODIMENTS

Hereinafter, embodiments of the present invention will be described in detail with reference to the attached drawings.

Figure 1A:
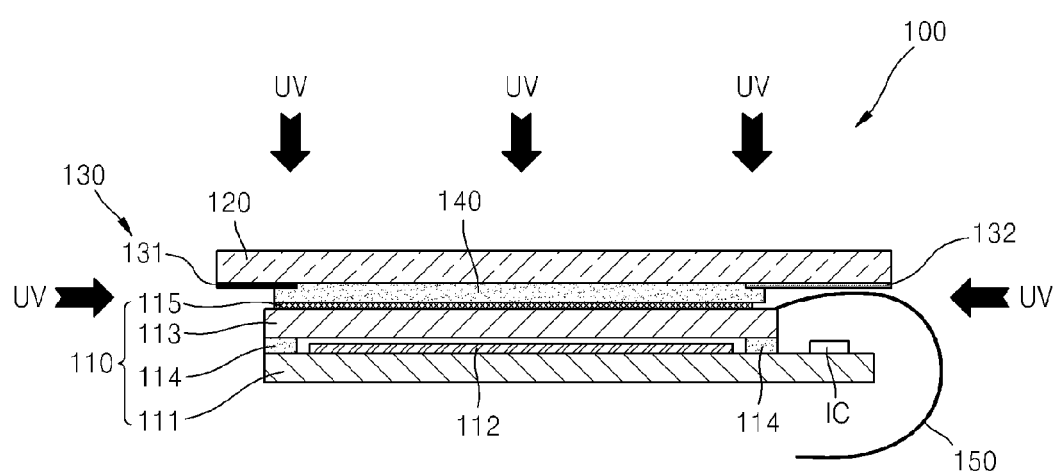
FIG. 1A is a diagram of a cross-sectional view of a structure of an embodiment of a flat panel display apparatus.
Figure 1B:
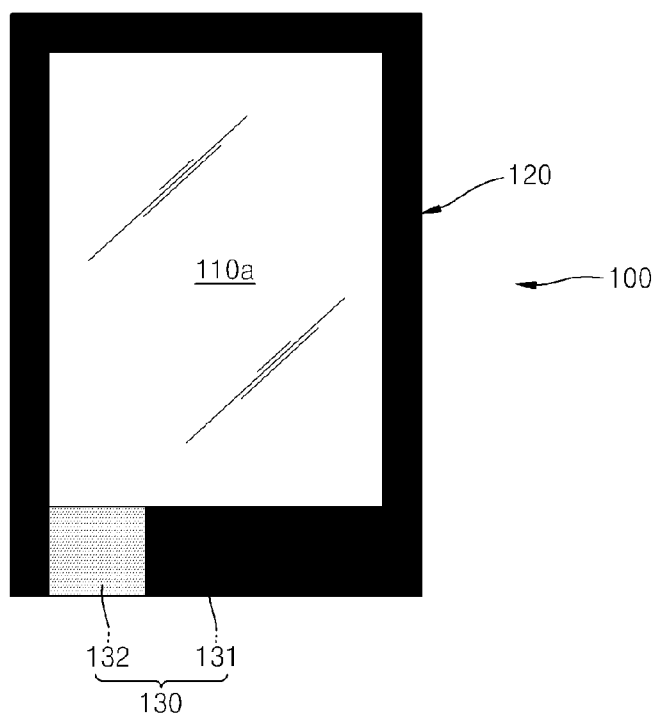
FIG. 1B is a plane view of the embodiment of a flat panel display apparatus of FIG. 1A.

FIG. 1A is a diagram of a cross-sectional view of a structure of an embodiment of a flat panel display apparatus 100. FIG. 1B is a plane view of the embodiment of a flat panel display apparatus 100, viewed from a window 120.

Referring to FIG. 1A, the flat panel display apparatus 100 has a structure in which the window 120, which may be a protective reinforced glass, covers a panel 110 on which an image is realized.

The panel 110 has a structure in which a display unit 112 is arranged between a lower substrate 111 and an upper substrate 113 combined to the lower substrate 111 by using a sealant 114, and a polarizing film 115 is formed on the upper substrate 113 so as to restrain reflection of external light. Thus, an image formed in the display unit 112 is viewed via the polarizing film 115 and the window 120.

The window 120 is bonded to the panel 110 by using a resin layer 140 that is ultraviolet (UV) curable. Since the resin layer 140 is cured by UV rays, when the window 120 and the panel 110 are close to each other while the resin layer 140 is interposed therebetween, and then UV rays are irradiated to the resin layer 140, the resin layer 140 is cured and thus the window 120 and the panel 110 are firmly combined.

A black matrix 130 is formed in the window 120 so as to circle an edge of an image region 110a (refer to FIG. 1B) of the panel 110, wherein the image region 110a indicates a region on which an image generated by the display unit 112 is displayed. By forming the black matrix 130 in a remaining region other than the image region 110a whereon an image is displayed, complicated wiring including a flexible printed circuit board (FPCB) 150 is covered.

The black matrix 130 includes a black ink part 131 formed of carbon black, and a diffusion ink part 132 formed of a mixture of carbon black and a UV-transmitting material. The black ink part 131 substantially blocks most of UV rays, and the diffusion ink part 132 transmits most of UV rays due to its UV-transmitting material. Since the diffusion ink part 132 is basically formed of carbon black, the diffusion ink part 132 in the window 120 may cover the complicated wiring, while still allowing UV rays to be transmitted therethrough. The black matrix 130 includes the diffusion ink part 132, which transmits UV rays, because of the FPCB 150 disposed below the black matrix 130.

As described above, in order to cure the resin layer 140, which is UV curable, UV rays are irradiated from above the window 120 as shown in FIG. 1A. Since the black ink part 131 of the black matrix 130 blocks UV rays, a portion of the resin layer 140 below the black ink part 131 may not be fully cured. Therefore, as shown in FIG. 1A, UV rays are irradiated not only from above the window 120 but also from sides of the window 120. Due to a flexible characteristic of the FPCB 150 mounted at a side of the panel 110, a side surface of the resin layer 140 may be blocked by the FPCB 150. UV rays that are irradiated from the sides of the window 120 so as to cure a portion of the resin layer 140 below the black matrix 130 are blocked by the FPCB 150, and thus the curing may not be fully performed.

In some embodiments, the diffusion ink part 132 formed of the UV-transmitting material is arranged at a region of the black matrix 130 corresponding to where the FPCB 150 is mounted. By doing so, it is possible to allow UV rays irradiated from above the window 120 to reach a portion of the resin layer 140 below the diffusion ink part 132. UV rays irradiated from above the window 120 pass through the diffusion ink part 132 and reach the region of the black matrix 130 corresponding to where the FPCB 150 is mounted. The portion of the resin layer 140 below the black matrix 130 is thus fully cured, and thus bonding between the window 120 and the panel 110 is improved.

The UV-transmitting material of the diffusion ink part 132 may include acrylic resin, cyclohexanone, aromatic hydrocarbon solvent, ethylene glycol monoethyl ether acetate, and the like.

In some embodiments, the flat panel display apparatus 100 may be manufactured in the following manner.

First, the panel 110 including the lower and upper substrates 111 and 113, the display unit 112, the polarizing film 115, and the window 120 having the black matrix 130 formed therein are prepared.

The black matrix 130 has a structure in which the black ink part 131 and the diffusion ink part 132 are separately formed, and the diffusion ink part 132 is formed in the region of the black matrix 130 corresponding to where the FPCB 150 is mounted.

Afterward, the panel 110 and the window 120 are bonded to each other by having the UV curable resin layer 140 interposed therebetween, and after the bonding is complete, UV rays are irradiated from above and from the sides of the window 120 so as to cure the resin layer 140.

Thus, in various embodiments of the structure of the flat panel display apparatus 100, the resin layer 140, including the portion of resin layer 140 below the black matrix 130, is sufficiently cured, and thus bonding between the window 120 and the panel 110 may be improved.

Figure 2A:
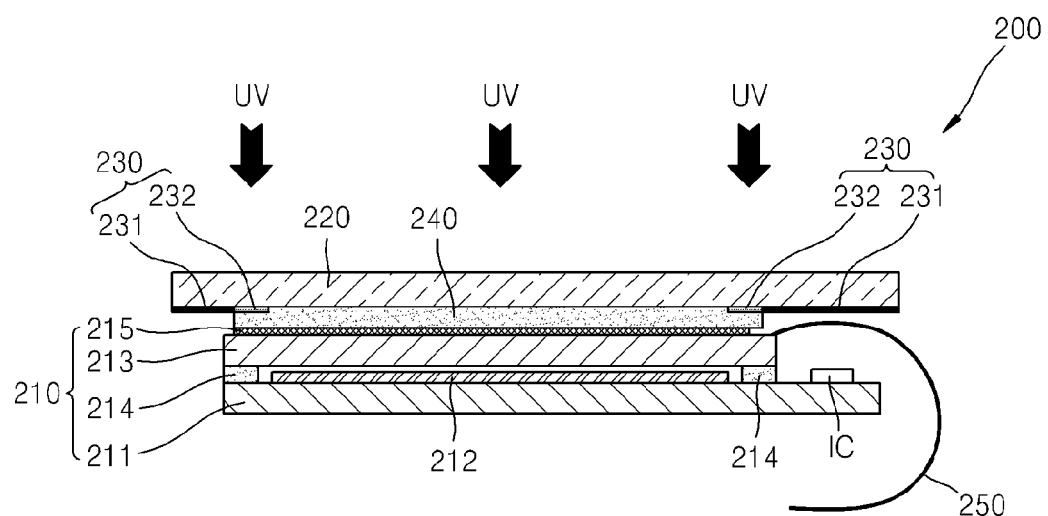
FIG. 2A is a diagram of a cross-sectional view of a structure of another embodiment of a flat panel display apparatus.
Figure 2B:
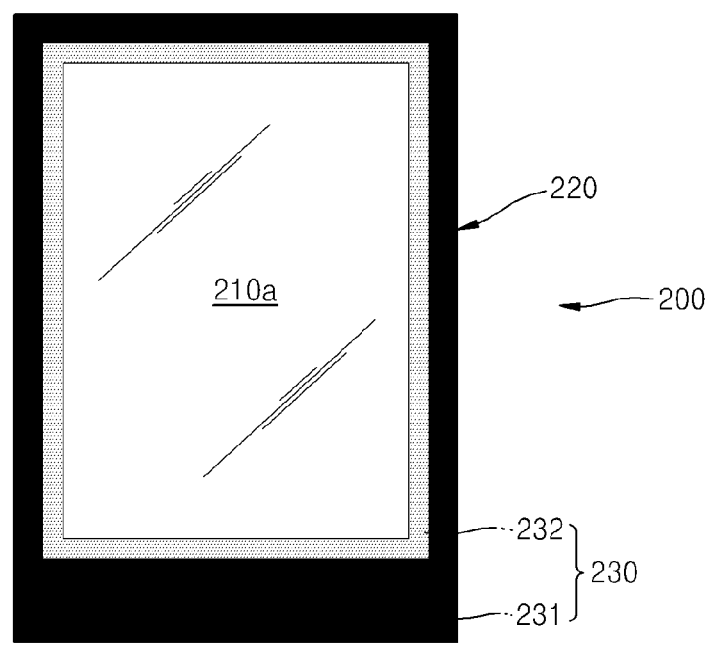
FIG. 2B is a plane view of the embodiment of a flat panel display apparatus of FIG. 2A.

FIGS. 2A and 2B illustrate another embodiment of a flat panel display apparatus 200.

The flat panel display apparatus 200 has a structure in which a window 220, which may be a protective reinforced glass, covers a panel 210 on which an image is realized.

The panel 210 has a structure in which a display unit 212 is arranged between a lower substrate 211 and an upper substrate 213 combined to the lower substrate 211 by using a sealant 214, and a polarizing film 215 is formed on the upper substrate 213 so as to restrain reflection of external light. Thus, an image formed in the display unit 212 is viewed via the polarizing film 215 and the window 220.

The window 220 is bonded to the panel 210 by using a resin layer 240 that is UV curable. Since the resin layer 240 is cured by UV rays, when the window 220 and the panel 210 are close to each other while the resin layer 240 is interposed therebetween, and then UV rays are irradiated to the resin layer 240, the resin layer 240 is cured and thus the window 220 and the panel 210 are firmly combined.

A black matrix 230 is formed in the window 220 so as to circle an edge of an image region 210a (refer to FIG. 2B) of the panel 210, wherein the image region 210a indicates a region on which an image generated by the display unit 212 is displayed. By forming the black matrix 230 in a remaining region other than the image region 210a whereon an image is displayed, complicated wiring including an FPCB 250 is covered.

The black matrix 230 includes a black ink part 231 formed of carbon black, and a diffusion ink part 232 formed of a mixture of carbon black and a UV-transmitting material. The black ink part 231 substantially blocks most of UV rays, and the diffusion ink part 232 transmits most of UV rays due to its UV-transmitting material. Since the diffusion ink part 232 is basically formed of carbon black, the diffusion ink part 232 in the window 220 may cover the complicated wiring, while still allowing UV rays to be transmitted therethrough.

The black matrix 230 includes the diffusion ink part 232, which transmits UV rays, in order to simplify a UV ray irradiation process.

As described above, in order to cure the resin layer 240, which is UV curable, UV rays are irradiated from above the window 220 as shown in FIG. 2A. However, since the black ink part 231 of the black matrix 230 blocks UV rays, a portion of the resin layer 240 below the black ink part 231 may not be fully cured. Thus, in consideration of this problem, according to the embodiment described above, UV rays are irradiated not only from above the window 120 but also from sides of the window 120. The two-stepped irradiation may slow down the manufacturing speed.

In other embodiments, a portion of the black matrix 230 above the resin layer 240 may be formed of only the diffusion ink part 232, not the black ink part 231. The portion of the black matrix 230 above the resin layer 240 may be formed of only the diffusion ink part 232, which is capable of transmitting UV rays, and thus the resin layer 240 may be sufficiently cured simply by UV rays irradiated from above the window 220.

The UV-transmitting material of the diffusion ink part 232 may include acrylic resin, cyclohexanone, aromatic hydrocarbon solvent, ethylene glycol monoethyl ether acetate, and the like.

Embodiments of the flat panel display apparatus 200 may be manufactured in the following manner.

The panel 210 including the lower and upper substrates 211 and 213, the display unit 212, the polarizing film 215 and the window 220 having the black matrix 230 formed therein may be prepared.

The black matrix 230 has a structure in which the black ink part 231 and the diffusion ink part 232 are separately formed, and as shown in FIG. 2B, the black matrix 230 has a closed-loop shape in which the black ink part 231 is formed at an outer side of the closed-loop shape, and the diffusion ink part 232 is formed at an inner side of the closed-loop shape so as to overlap with the resin layer 240.

The panel 210 and the window 220 are bonded to each other by having the UV curable resin layer 240 interposed therebetween, and after the bonding is complete, UV rays are irradiated from above the window 220 so as to cure the resin layer 240.

Thus, in embodiments of the structure of the flat panel display apparatus 200, UV rays irradiated from above the window 220 reach a portion of the resin layer 240 below the black matrix 230, and thus the resin layer 240 may be sufficiently cured.

Figure 3A:
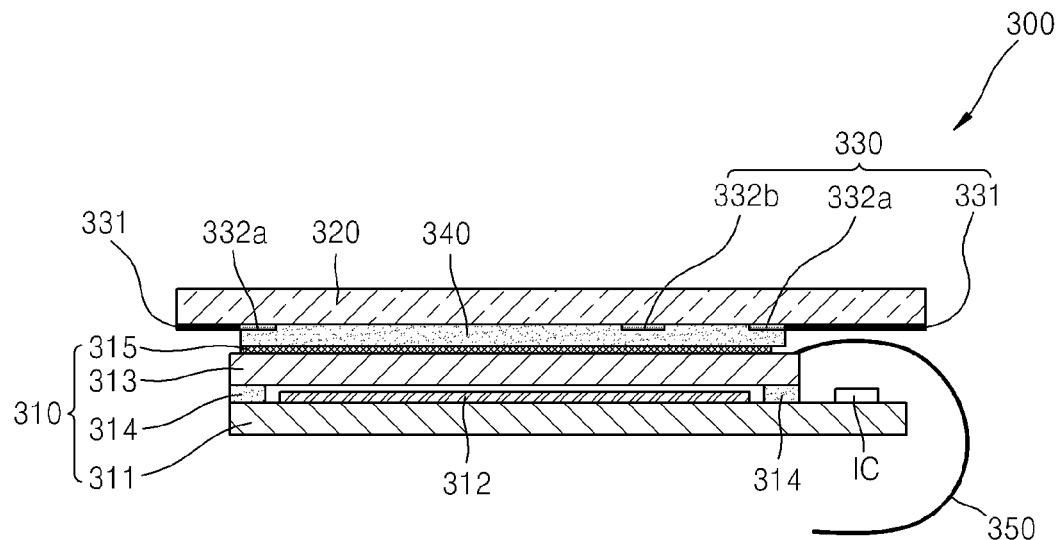
FIG. 3A is a diagram of a cross-sectional view of a structure of another embodiment of a flat panel display apparatus.
Figure 3B:
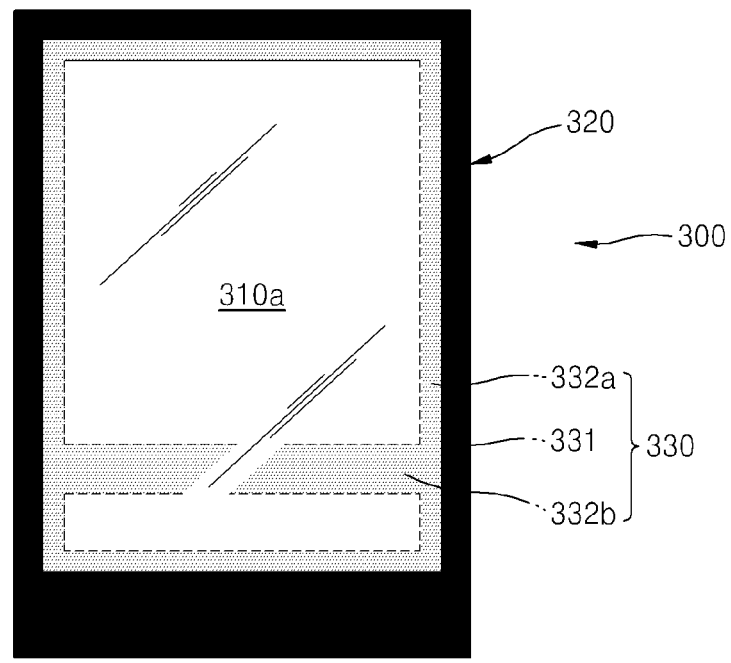
FIG. 3B is a plane view of the embodiment of a flat panel display apparatus of FIG. 3A.

FIGS. 3A and 3B illustrate another embodiment of a flat panel display apparatus 300.

The flat panel display apparatus 300 has a structure in which a window 320, which may be a protective reinforced glass, covers a panel 310 on which an image is realized.

The panel 310 has a structure in which a display unit 312 is arranged between a lower substrate 311 and an upper substrate 313 combined to the lower substrate 311 by using a sealant 314, and a polarizing film 315 is formed on the upper substrate 313 so as to restrain reflection of external light. Thus, an image formed in the display unit 312 is viewed via the polarizing film 315 and the window 320.

The window 320 is bonded to the panel 310 by using a resin layer 340 that is UV curable. Since the resin layer 340 is cured by UV rays, when the window 320 and the panel 310 are close to each other while the resin layer 340 is interposed therebetween, and then UV rays are irradiated to the resin layer 340, the resin layer 340 is cured and thus the window 320 and the panel 310 are firmly combined.

A black matrix 330 is formed in the window 320 so as to circle an edge of an image region 310a (refer to FIG. 3B) of the panel 310, wherein the image region 310a indicates a region on which an image generated by the display unit 312 is displayed. By forming the black matrix 330 in a remaining region other than the image region 310a whereon an image is displayed, complicated wiring including an FPCB 350 is covered.

The black matrix 330 includes a black ink part 331 formed of carbon black, and diffusion ink parts 332a and 332b formed of a mixture of carbon black and a UV-transmitting material. The black ink part 331 substantially blocks most of UV rays, and the diffusion ink parts 332a and 332b transmit most of UV rays due to their UV-transmitting material. Since the diffusion ink parts 332a and 332b are basically formed of carbon black, the diffusion ink parts 332a and 332b in the window 320 may cover the complicated wiring, while still allowing UV rays to be transmitted therethrough.

As described above, the structure of the flat panel display apparatus 300 is basically the same as the structure of the flat panel display apparatus 200. In some embodiments, the diffusion ink part 332b of the black matrix 330 is also formed in the image region 310a. Since a portion of the image region 310a may overlap with the resin layer 340, if the black ink part 331 is formed in the lower portion, a curing defect may be incurred. Thus, in a case where the black matrix 330 is formed in the image region 310a, a problem in which a portion of the resin layer 340 below the black matrix 330 is not cured may be solved by using the diffusion ink part 332b.

Embodiments of the flat panel display apparatus 300 may be manufactured in the following manner.

The panel 310 including the lower and upper substrates 311 and 313, the display unit 312, the polarizing film 315 and the window 320 having the black matrix 330 formed therein may be prepared.

The black matrix 330 has a structure in which the black ink part 331 and the diffusion ink parts 332a and 332b are separately formed, and as shown in FIG. 3B, the black ink part 331 is formed at an outer side of the image region 310a, and the diffusion ink parts 332a and 332b are formed at an inner side of the black ink part 331, and in the image region 310a, respectively.

The panel 310 and the window 320 are bonded to each other by having the UV curable resin layer 340 interposed therebetween, and after the bonding is complete, UV rays are irradiated from above the window 320 so as to cure the resin layer 340.

UV rays irradiated from above the window 320 reach a portion of the resin layer 340 below the black matrix 330, and thus the resin layer 340 may be sufficiently cured.

As described above, in embodiments of the flat panel display apparatus, the resin layers for window bonding are sufficiently cured in all regions, including regions thereof below the black matrixes and thus a bonding defect in the windows due to insufficient curing of the resin layers may be significantly decreased.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. A flat panel display apparatus comprising: a panel comprising an image region on which an image is realized; a window covering the panel; a black matrix formed in the window along a side edge of the image region; and a resin layer that is ultraviolet (UV) curable and configured to bond the panel and the window, wherein the black matrix comprises a black ink part for blocking UV rays, and a diffusion ink part for transmitting UV rays, wherein a first portion of the diffusion ink part is formed in the image region of the panel, extending through one side edge of the image to the opposite side edge of the image region of the panel and a second portion of the diffusion ink part is formed at a position of the side edge of the region corresponding to a region in which a flexible printed circuit board (FPCB) of the panel is formed.

2. The flat panel display apparatus of claim 1, wherein the black ink part is formed of carbon black.

3. The flat panel display apparatus of claim 1, wherein the diffusion ink part is formed of a mixture of carbon black and a UV-transmitting material.

4. The flat panel display apparatus of claim 3, wherein the UV-transmitting material comprises at least one of acrylic resin, cyclohexanone, aromatic hydrocarbon solvent, and ethylene glycol monoethyl ether acetate.

5. The flat panel display apparatus of claim 1, wherein the black ink part is formed along the side edge of the image region.

6. The flat panel display apparatus of claim 1, wherein the black ink part is formed along the side edge of the image region, and the second portion of the diffusion ink part has a closed-loop shape formed along an inner side edge of the black ink part.

7. The flat panel display apparatus of claim 1, wherein the black ink part is formed along the side edge of the image region.

8. The flat panel display apparatus of claim 1, wherein a polarizing film is interposed between the panel and the resin layer.

9. A method of manufacturing a flat panel display apparatus, the method comprising: preparing a panel comprising an image region on which an image is realized, and a window covering the panel; forming a black matrix in the window along a side edge of the image region; forming a resin layer that is ultraviolet (UV) curable between the panel and the window; and curing the resin layer by irradiating UV rays to the UV curable resin layer, wherein the forming of the black matrix comprises forming a black ink part for blocking UV rays, and forming a diffusion ink part for transmitting UV rays by forming a first portion of the diffusion ink part in the image region of the panel, extending through one side edge of the image to the opposite side edge of the image region of the panel and forming a second portion of the diffusion ink part at a position of the side edge of the image region corresponding to a region in which a flexible printed circuit board (FPCB) of the panel is formed.

10. The method of claim 9, wherein the black ink part is formed of carbon black.

11. The method of claim 9, wherein the diffusion ink part is formed of a mixture of carbon black and a UV-transmitting material.

12. The method of claim 11, wherein the UV-transmitting material comprises at least one of acrylic resin, cyclohexanone, aromatic hydrocarbon solvent, and ethylene glycol monoethyl ether acetate.

13. The method of claim 9, wherein the black ink part is formed along the side edge of the image region.

14. The method of claim 9, wherein the black ink part is formed along the side edge of the image region, and the second portion of the diffusion ink part has a closed-loop shape formed along an inner side edge of the black ink part.

15. The method of claim 9, wherein the black ink part is formed along the side edge of the image region.

16. The method of claim 9, further comprising forming a polarizing film between the panel and the resin layer.

* * * * *